Dec. 20, 1932.    C. C. FARMER    1,891,671
FLUID PRESSURE BRAKE
Filed May 5, 1930
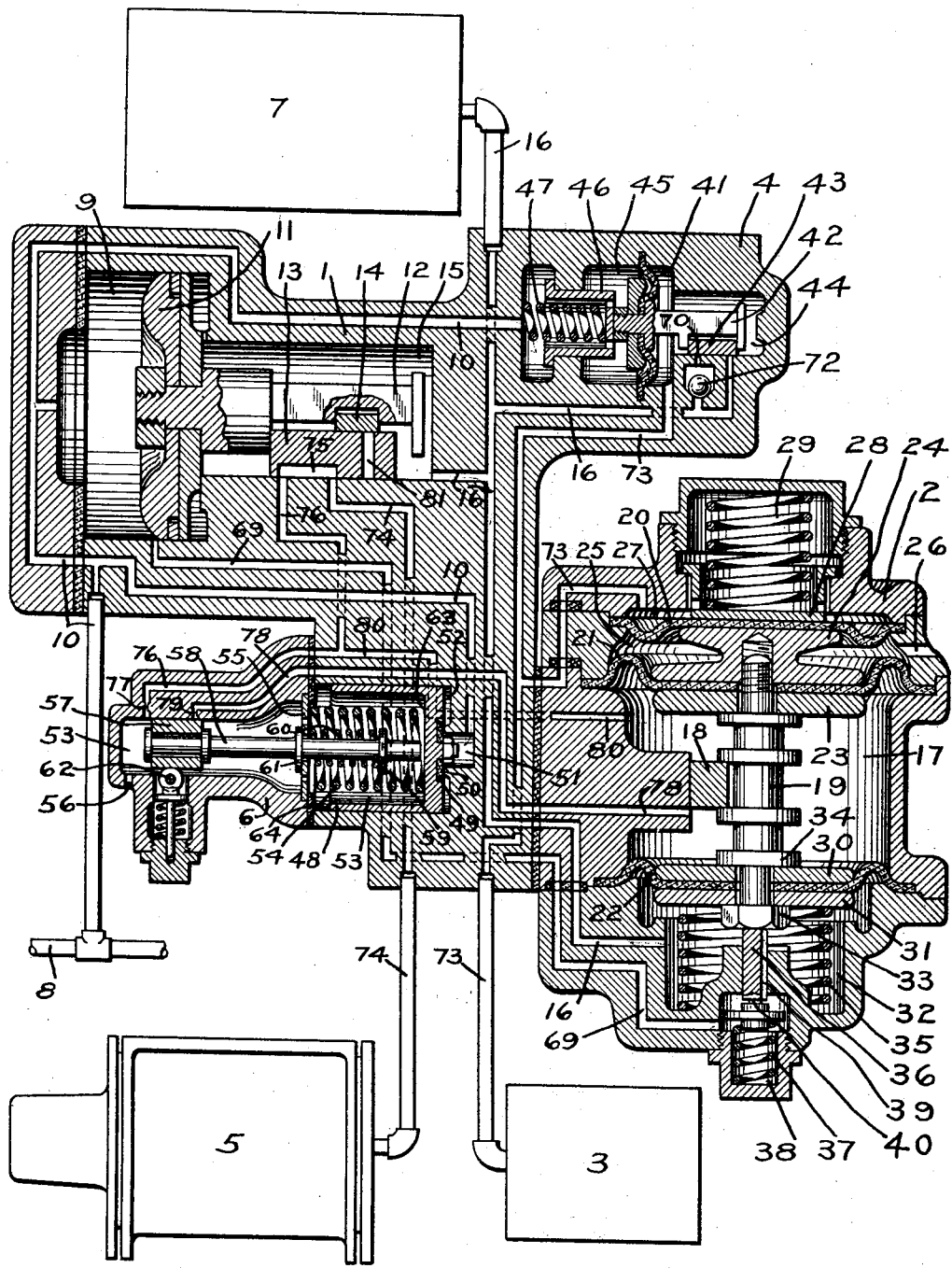
INVENTOR
CLYDE C. FARMER
BY Wm. M. Cady
ATTORNEY

Patented Dec. 20, 1932

1,891,671

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed May 5, 1930. Serial No. 449,763.

This invention relates to fluid pressure brakes, and has for its principal object to provide improved means whereby the engineer may, from his station in the locomotive cab, obtain at will, either a direct or a graduated release of the brakes on a car or train of cars to which the locomotive is coupled.

Another object of my invention is to provide a fluid pressure brake equipment having an improved change-over valve device which is operative automatically to provide for the direct or graduated release of the brakes.

A further object of my invention is to provide a fluid pressure brake equipment having a change-over valve device which is subject to variations in brake pipe pressure for selectively providing for either the direct or graduated release of the brakes.

A still further object of my invention is to provide a fluid pressure brake equipment having a change-over valve device which is adapted to be maintained in graduated release position by fluid under pressure.

Other objects and advantages will appear in the following more detailed description of the invention.

In the accompanying drawing, the single figure is a diagrammatic view, mainly in section, of a fluid pressure brake equipment embodying my invention.

With the exception of the automatic change-over valve device, which will hereinafter be fully described, the fluid pressure brake equipment shown and described in this application is substantially the same as that disclosed in my pending application for United States Letters Patent, filed March 9, 1929, for improvements in fluid pressure brakes and serially numbered 345,659, and my pending application, filed December 14, 1929, for improvements in fluid pressure brakes and serially numbered 413,892.

As shown in the drawing, the equipment may comprise a triple valve device 1, a control valve device 2, a control reservoir 3, a combined control reservoir charging and discharging valve device 4, a brake cylinder 5, a release change-over valve device 6, an auxiliary reservoir 7, and a brake pipe 8.

The triple valve device 1 may comprise a casing having a piston chamber 9 which is connected to the brake pipe 8 through a passage and pipe 10 and contains a piston 11 having a stem 12 adapted to operate a main slide valve 13 and an auxiliary slide valve 14 contained in a chamber 15, which chamber 15 is connected to the auxiliary reservoir 7 through a passage and pipe 16.

The control valve device 2 may comprise a casing having a valve chamber 17 containing a slide valve 18 which is operatively connected to an operating stem 19. The valve 18 and stem 19 are adapted to be operated through the medium of spaced flexible diaphragms 20, 21 and 22 which are secured in the casing.

The flexible diaphragm 21 is clamped between a follower plate 23 contained in the slide valve chamber 17 and a follower member 24 contained in a chamber 25 constantly connected to the atmosphere through a passage 26. The follower member 24 has screw-threaded connection with the stem 19 and the upper end of said member engages the under side of the diaphragm 20.

Contained in a chamber 27 at one side of the diaphragm 20 is a movable stop 28 which is subject, on one side, to the pressure of a spring 29.

The flexible diaphragm 22 is clamped between a follower plate 30 contained in the chamber 17 and a follower plate 31 contained in a chamber 32, through the medium of a nut 33 having screw-threaded connection with the lower end of the stem 19, which end passes through the follower plates and the diaphragm, the upper side of the plate 30 abutting against a shoulder 34 on the stem 19, and the nut 33 engaging the under side of the plate 31. Contained in the chamber 32 and interposed between and engaging the under side of the plate 31 and the casing, is a coil spring 35.

Within the chamber 32, the lower end of the stem 19 engages the upper end of a fluid pressure supply control member 36 which is slidably mounted in the casing and which is subject to the pressure of a coil spring 37 contained in a chamber 38 and interposed between and engaging the lower end of the member and the casing.

The member 36 is provided with a longitudinal groove 39, the lower end of which is open to a circular groove 40 formed in the member adjacent its lower end, said grooves establishing communication from the chamber 38 to the diaphragm chamber 32.

The combined control reservoir charging and discharging valve device 4 may comprise a casing in which there is secured a flexible diaphragm 41, having secured thereto a stem 42 adapted to operate a slide valve 43 contained in a chamber 44 at one side of the diaphragm.

Contained in a chamber 45 at the other side of the diaphragm 41, is a stop 46 which is subject to the pressure of a coil spring 47 and which is adapted to be engaged by one end of the stem 42.

The release change-over valve device 6 may comprise a casing in which there is mounted a valve piston 48, having a gasket 49 adapted to seat on a seat ring 50 to close communication from a chamber 51, which is constantly connected to the brake pipe 10, and a chamber 52 at one side of the valve piston. The chamber 53 at the other side of the valve piston contains a spring 54 which is interposed between and engages the valve piston and a plate 55 secured to the casing. This chamber 53 extends beyond the plate 55, and is constantly connected to the atmosphere through a passage 56, and contains a slide valve 57 which is movable, to select either a direct or graduated release of the brakes by a valve stem 58 which extends through a central opening in the plate 55. Between the inner end of the stem and the inner surface of the plate 55, the stem is provided with a collar 59, which is subject to the pressure of a spring 60 interposed between and engaging the inner surface of the plate 55 and the collar. The stem 58 is also provided with a collar 61 which is adapted to engage the outer surface of the plate 55 to limit movement of the stem in a direction toward the right hand.

The slide valve 57 is maintained in close contact with its seat by a spring-pressed roller 62 mounted in the casing.

It will be noted that when the release change-over valve device 6 is in direct release position, as shown in the drawing, there will be a space between the extreme inner end of the valve stem 58 and the adjacent surface 63 of the valve piston. This space is provided for the purpose of permitting the valve piston to be unseated from its seat ring 50 without having to first overcome the pressure of the spring 60 and the frictional resistance of the slide valve 57. This feature is very important and will be hereinafter more fully described.

In initially charging the equipment, fluid under pressure supplied to the brake pipe 8, flows through pipe and passage 10 to the triple valve piston chamber 9, the chamber 51 in the change-over valve device and the diaphragm chamber 45 in the valve device 4.

The pressure of fluid thus supplied to the piston chamber 9 causes the triple valve piston 11 to be moved to its innermost or release position, as shown in the drawing, carrying with it the slide valves 13 and 14. With the piston in this position, fluid supplied to the piston chamber 9, flows to the triple valve slide valve chamber 15 and auxiliary reservoir 7 through a passage 69, chamber 38 in the control valve device 2, grooves 40 and 39 in the member 36, diaphragm chamber 32 and passage and pipe 16.

The pressure of fluid supplied to the diaphragm chamber 45 in the valve device 4, causes the diaphragm 41 to flex to shift the stem 42 and slide valve 43 in a direction toward the right hand to their charging positions, in which the slide valve 43 uncovers a restricted port 70, so that fluid under pressure supplied to the passage 16 will also flow to the flexible diaphragm chamber 27 in the control valve device, a diaphragm chamber 71 at one side of the flexible diaphragm 48 of the change-over valve device 6 and to the control reservoir 3, past a ball check valve 72, through port 70, slide valve chamber 44 and passage 73.

With the triple valve device in release position, the brake cylinder 5 is connected to the atmosphere by way of a pipe and passage 74, a cavity 75 in the main slide valve 13, a passage 76 having a restriction 77, valve chamber 53 in the change-over valve device and passage 56.

The flexible diaphragm 20 and 22 are of equal area, and since the pressure of fluid supplied to the diaphragm chambers 27 and 32 are substantially equal, the pressure of the spring 35 will maintain the diaphragm 20 in engagement with the spring-pressed stop 28. When the diaphragm 20 engages the stop, the control valve device will be balanced and the valve 18 will have been moved upwardly beyond a passage 78 leading to the seat of the change-over slide valve 55, said passage containing a restriction 79.

The pressure of the spring 54 of the change-over valve device 6 is such as to maintain the valve piston 48 seated on the seat ring 50 against the pressure of fluid in the chamber 51 supplied from the brake pipe 10 and acting on the inner seated area of the valve piston. With the valve piston thus seated, the pressure of the spring 60 maintains the valve stem 58 and slide valve in their direct release positions as shown in the drawing, in which position, the slide valve covers the passage 78 and uncovers the passage 76.

With the passage 76 uncovered, the valve chamber 17 in the control valve device is connected to the atmosphere by way of a passage 80, passage 76, restriction 77, valve chamber 53 in the change-over valve device and passage 56.

With the equipment thus fully charged and the brake cylinder connected to the atmosphere, a service application of the brakes is effected by making a gradual brake pipe reduction in the usual manner, which results in a corresponding reduction in the pressure of fluid in the triple valve piston chamber 9. When the pressure of fluid in the piston chamber 9 is thus reduced, the pressure of fluid in the slide valve chamber 15 causes the triple valve piston 11 to operate to shift the auxiliary slide valve 14 and main slide valve 13 to their application positions.

When the triple valve slide valves are thus operated to their application positions, fluid under pressure supplied to the slide valve chamber 15 from the auxiliary reservoir 7, flows to the brake cylinder 5 through a port 81 in the main slide valve 13 and passage and pipe 74.

If, in effecting an application of the brakes, it is desired to limit the brake cylinder pressure, the usual brake valve device (not shown) is operated to lap position. Now when the pressure of fluid in the auxiliary reservoir, present in the slide valve chamber 15 in the triple valve device, becomes slightly less than the brake pipe pressure present in the triple valve piston chamber 9, the triple valve piston is caused to operate to shift the auxiliary slide valve 14, relative to the main slide valve 13, to service lap position, in which the slide valve 14 laps port 81 in the main slide valve 13, thus closing off the further supply of fluid under pressure to the brake cylinder.

To release the brakes after a service application, the pressure of fluid in the brake pipe 8 is increased in the usual well known manner, causing the triple valve piston 11 to operate to shift the triple valve slide valves 13 and 14 to their innermost or release positions. With the main slide valve 13 in release position, fluid under pressure is vented from the brake cylinder 5 to the atmosphere by way of pipe and passage 74, cavity 75 in the main slide valve 13, passage 76, restriction 77, valve chamber 53 in the change-over valve device and passage 56.

Thus far, in the specification, the operation of the equipment has been described with the change-over valve device 6 in its direct release position.

Should it be desired to effect the graduated release of the brakes, the engineer adjusts the usual feed valve device (not shown) on the locomotive, so as to provide a definite higher pressure in the brake pipe than the normal pressure carried in the brake pipe.

Fluid at this higher pressure is supplied to the auxiliary reservoir 7 by way of pipe and passage 10, triple valve piston chamber 9, passage 69, chamber 38 in the control valve device, grooves 40 and 39 in the member 36, diaphragm chamber 32 and passage and pipe 16.

From the passage 10, fluid at this higher pressure is supplied to the chamber 51 in the change-over valve device 6 and is also supplied to the diaphragm chamber 45 in the valve device 4, causing the diaphragm 41 to flex toward the right hand, which in turn, shifts the slide valve 43 to its charging position, in which the passage 70 is uncovered. With the passage 70 thus uncovered, fluid under pressure supplied to the passage 16 flows to the control reservoir 3 and diaphragm chamber 27 in the control valve device.

Fluid at this higher pressure supplied to the chamber 51 in the change-over valve device and acting upon the inner seated area of the valve piston 48, is sufficient to overcome the pressure of the spring 54, so that the valve piston is shifted toward the left hand, unseating the gasket 49 from the seat ring 50 permitting fluid under pressure to flow to the valve piston chamber 52. When the valve piston is thus unseated from the seat ring, the surface 63 engages the inner end of the valve stem 58. Fluid under pressure supplied to the chamber 52 and acting over the entire area of the end of the valve piston causes said valve piston to move to its extreme left hand position, carrying with it the valve stem 58 and slide valve 57, the valve piston moving against the opposing pressure of springs 54 and 60. With the slide valve 57 thus shifted to graduated release position, the passage 76 is blanked and the passage 78 uncovered.

The left hand end of the valve piston seats against a gasket 64 when the valve piston is in graduated release position and prevents the leakage of fluid under pressure from the brake pipe to the atmosphere past the valve piston.

Fluid under pressure in the chamber 52 now maintains the change-over valve piston 48, stem 58 and slide valve 57 in their graduated release positions until the brake pipe pressure has been reduced to a low degree, say for instance, thirty pounds, thus preventing the unintentional return of the change-over valve device to direct release position when the usual brake pipe reductions are effected in controlling the brakes.

With the change-over valve device 6 in graduated release position, as just described, a service application of the brakes is effected by making a gradual brake pipe reduction in the usual manner, which permits the triple valve device to operate in the manner hereinbefore described to supply fluid under pressure from the auxiliary reservoir 7 to the brake cylinder 5.

With the triple valve piston 11 in application position, the passage 69 is connected to the triple valve slide valve chamber 15 so that pressure of fluid in the diaphragm chamber 32 will reduce with the auxiliary reservoir pressure.

When the auxiliary reservoir pressure present in the diaphragm chamber 32 is thus reduced, the higher control reservoir pressure present in the diaphragm chamber 27, acting on the diaphragm 20, causes said diaphragm to operate to shift the control slide valve 18 downwardly against the reduced auxiliary reservoir pressure in chamber 32 and the pressure of the spring 35, blanking the passage 78 and thereby closing communication from the control valve chamber 17 to the atmosphere.

It will here be noted, that the spring 47 of the valve device 4 is of such a value that, when a service reduction in brake pipe pressure is effected, the stop 46, which is subject to the pressure of the spring 47, will prevent the diaphragm 41 from operating to shift the slide valve 43 to such a position that it will uncover the passage 16 leading to the auxiliary reservoir, and thus the control reservoir pressure will be maintained to govern the operation of the control valve device 2.

To release the brakes after a service application with the change-over valve device in graduated release position, the pressure of fluid in the brake pipe 8 is increased in the usual manner, causing the triple valve device to operate to release position, in which the passage 69 is again connected to the triple valve piston chamber 9, so that fluid at brake pipe pressure is again supplied from the chamber 9 to the diaphragm chamber 32 in the control valve device and auxiliary reservoir 7.

Now when the pressure of fluid thus supplied to the chamber 32, acting on the under side of the diaphragm 22, together with the pressure of fluid from the brake cylinder and present in the control slide valve chamber 17, acting on the under side of the large diaphragm 21, is substantially equal to the pressure of fluid from the control reservoir acting on the upper side of the diaphragm 20 together with the pressure of fluid in the chamber 17 acting on the upper side of the diaphragm 22, the pressure of the spring 35 causes the diaphragms and stem 19 to be operated upwardly until they are brought to a stop by the diaphragm 20 engaging the spring-pressed stop 28 at which time the control slide valve 18 will have been moved to a position in which the passage 78 is uncovered.

With the passage 78 thus uncovered, fluid under pressure is discharged from the brake cylinder 5 to the atmosphere through pipe and passage 74, cavity 75 in the triple valve slide valve 13, passage 76 and 80, slide valve chamber 17 in the control valve device, past the end of the control slide valve 18, through passage 78, restriction 79, change-over slide valve chamber 53 and passage 56.

If after a service application of the brakes, it is desired to graduate their release, the brake pipe pressure may be increased to effect the desired reduction in brake cylinder pressure. This increase in brake pipe pressure causes the triple valve device to operate to release position, in which, the brake cylinder 5 is connected to the valve chamber 17 in the control valve device through pipe and passage 74, cavity 75 in the triple valve slide valve 13 and passages 76 and 80.

Since, with the triple valve device in release position, the pressure of fluid in the diaphragm chamber 32 in the control valve device and in the auxiliary reservoir will be increased an amount equal to the increase in brake pipe pressure, the pressure of fluid in this chamber acting on the under side of the diaphragm 22 together with the pressure of fluid in the slide valve chamber 17 acting on the under side of the large diaphragm 21, will be sufficient to overcome the control reservoir pressure present in the diaphragm chamber 27 acting on the diaphragm 20 together with the pressure of fluid in the control valve chamber 17, acting on the diaphragm 22, and the diaphragms 20, 21 and 22 and the stem 19 will move upwardly to the position shown in Figure 1, shifting the control slide valve to a position in which the passage 78 is uncovered. With the passage 78 thus uncovered, fluid under pressure is discharged from the brake cylinder 5 to the atmosphere in the manner hereinbefore described.

Now, when the brake cylinder pressure effective in the control valve chamber 17, reduces an amount proportionate to the increase in brake pipe pressure, the pressures acting downwardly on the diaphragms will exceed the pressures acting upwardly so that these diaphragms together with the stem 19 will be moved downwardly again, shifting the control slide valve 18 to the position in which it blanks the passage 78, closing off the further discharge of fluid under pressure from the brake cylinder to the atmosphere. By effecting further increases in brake pipe pressure, the equipment will operate to further reduce brake cylinder pressure.

Assuming now that the change-over valve device 6 is in graduated release position and it is desired to change it to direct release position, the engineer first adjusts the feed valve device so as to maintain the brake pipe pressure at the normal pressure instead of at the higher than normal pressure and then reduces the brake pipe pressure to a predetermined degree below the pressure carried in the brake pipe when normally effecting a full service application. As before stated, the brake pipe pressure is reduced to about thirty pounds. When the brake pipe pressure is thus reduced an application of the brakes is effected which may or may not bring the train to a stop, depending upon the period of time that elapses before the brake pipe is recharged.

As the pressure of fluid in the brake pipe reduces, the pressure of fluid in the chamber 52 in the change-over valve device 6 reduces with it, and when the pressure in this chamber has been reduced to about thirty pounds, the pressure of the spring 54 will cause the valve piston to move to its extreme right hand position and seat the gasket 49 on the seat ring 50, thus closing communication from the brake pipe 10 and chamber 51 to the chamber 52.

As the valve piston is thus shifted, the pressure of the spring 60 causes the valve stem 58 to move to its extreme right hand position, carrying the change-over slide valve 57 to its direct release position as shown in the drawing.

The pressure of fluid in the diaphragm chamber 45 of the valve device 4 is also reduced with the brake pipe pressure, so that the control reservoir pressure, present in the valve chamber 44, acting on one side of the diaphragm 41, causes said diaphragm to flex toward the left hand against the pressure of the spring-pressed stop 46, shifting the slide valve 43 to its discharging position in which, the pressure of fluid in the control reservoir 3, and diaphragm chamber 27 in the control valve device is reduced into the auxiliary reservoir 7 by way of passage 73, past the end of the slide valve 43, through slide valve chamber 44 and passage 16.

In thus operating the equipment for changing the position of the change-over valve device from its graduated release position to its direct release position, an application of the brakes is effected which as before described does not necessarily bring the train to a stop and when desired, the direct release of the brakes may be effected in the same manner as previously described in this specification.

From the foregoing description, it will be noted that a continuous and complete release of the brakes or a graduated release of the brakes may be effected through the control valve device and that a direct release of the brakes may be effected independently of the control valve device and that the release desired may be selected by the engineer from his cab in a locomotive.

In a train it may be that some of the cars will be equipped with the usual or standard direct release brakes and other cars may be equipped with the brake apparatus constructed in accordance with my present invention, and when such is the case, it is desirable to cut out, on the cars equipped with my improved brake apparatus, the graduated release feature, in order to provide for the harmonious operation of the brakes throughout the train.

If the graduated feature were not cut out on the cars equipped with the apparatus constructed in accordance with my invention, the engineer might operate his brake valve device to effect a graduated release of the brakes which would cause the direct release brakes to operate to completely release the brakes and cause the other brakes to partially release, which is undesirable. With my improved brake equipment changed over to direct release, this cannot happen and the brakes on all of the cars will operate in harmony.

It will be understood from the foregoing description that I have provided a fluid pressure brake equipment whereby the engineer, from his cab on the locomotive may obtain, at will, either a direct or a graduated release of the brakes on a car or a train of cars.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of means for effecting a graduated release of the brakes, and means subject to variations in brake pipe pressure for rendering the first mentioned means either effective or ineffective to graduate the release of the brakes.

2. In a fluid pressure brake, the combination with a brake pipe, of means for effecting a graduated release of the brakes, and means for effecting a direct release of the brakes, and means subject to variations in brake pipe pressure for rendering one or the other of the first mentioned means effective or ineffective to control the release of the brakes.

3. In a fluid pressure brake, the combination with means for effecting a limited release of the brakes, of a valve having a position for rendering said means effective to limit the release of the brakes, and pressure sensitive means under the control of an operator for moving said valve to limited release position and for maintaining it in limited release position.

4. In a fluid pressure brake, the combination with means for effecting a partial release of the brakes, of a valve having a position for rendering said means effective to partially release the brakes, and a valve piston under the control of an operator for moving said valve to partial release position and for maintaining it in partial release position.

5. In a fluid pressure brake, the combination with means for effecting a graduated release of the brakes, of a valve operative to one position for rendering said means effective to graduate the release of the brakes and operative to another position for rendering said means ineffective to graduate the release of the brakes, pressure sensitive means subject to fluid under pressure for shifting said valve to the first mentioned position and for maintaining it in this position, and a spring for shifting said valve to the second mentioned position upon a predetermined reduction in the pressure of fluid acting on said pressure sensitive means.

6. In a fluid pressure brake, the combination with a brake pipe, of means for effecting a graduated release of the brakes, a valve operative to one position for rendering said means effective to graduate the release of the brakes and operative to another position for rendering said means ineffective to graduate the release of the brakes, and means subject to variations in brake pipe pressure for controlling the operation of said valve.

7. In a fluid pressure brake, the combination with a brake pipe, of means for effecting a graduated release of the brakes, and a valve device for rendering said means effective and ineffective to graduate the release of the brakes, said valve device being constantly subject to brake pipe pressure and normally rendering said means ineffective to graduate the release of the brakes and operative upon an increase in brake pipe pressure above that normally carried for rendering said means effective to graduate the release of the brakes.

8. In a fluid pressure brake, the combination with a brake pipe, of means for effecting a graduated release of the brakes, and a valve device for rendering said means effective and ineffective to graduate the release of the brakes, said valve device being constantly subject to brake pipe pressure and normally rendering said means ineffective to graduate the release of the brakes and operative only upon an increase in brake pipe pressure above that normally carried for rendering said means effective to graduate the release of the brakes.

9. In a fluid pressure brake, the combination with a brake pipe, of means for effecting a graduated release of the brakes, and a valve device for rendering said means effective and ineffective to graduate the release of the brakes, said valve device being constantly subject to brake pipe pressure and normally rendering said means ineffective to graduate the release of the brakes and operative upon an increase in brake pipe pressure above that normally carried for rendering said means effective to graduate the release of the brakes, and operative to again render said means ineffective to graduate the release of the brakes upon the reduction in brake pipe pressure below that normally carried.

10. In a fluid pressure brake, the combination with a brake pipe, of means for effecting a graduated release of the brakes, a valve having a position for rendering said means ineffective to graduate the release of the brakes and a position for rendering said means effective to graduate the release of the brakes, a spring, and means subject to the opposing pressures of said spring and fluid from said brake pipe for controlling the operation of said valve.

11. In a fluid pressure brake, the combination with a brake pipe, of means for effecting a graduated release of the brakes, a valve having a position for rendering said means ineffective to graduate the release of the brakes and a position for rendering said means effective to graduate the release of the brakes, a spring, and means subject to the pressure of said spring and variations in the pressure of fluid in the brake pipe for controlling the operation of said valve.

12. In a fluid pressure brake, the combination with a brake pipe, of means for effecting a graduated release of the brakes, a valve having a position for rendering said means ineffective to graduate the release of the brakes and a position for rendering said means effective to graduate the release of the brakes, a spring, and a valve piston constantly subject to the opposing pressures of said spring and fluid from said brake pipe for controlling the operation of said valve.

13. In a fluid pressure brake, the combination with a brake pipe, of means for effecting a partial release of the brakes, a valve having a normal position for rendering said means ineffective to partially release the brakes and operative to another position for rendering said means effective to partially release the brakes, a valve piston for controlling the operation of said valve, said valve piston being constantly subject to the pressure of fluid from said brake pipe, and means for maintaining said valve piston in its normal inoperative position against the pressure of fluid normally carried in the brake pipe.

14. In a fluid pressure brake, the combination with a brake pipe, of means for effecting a graduated release of the brakes, a valve having a normal position for rendering said means ineffective to graduate the release of the brakes and operative to another position for rendering said means effective to graduate the release of the brakes, a valve piston for controlling the operation of said valve, said valve piston being constantly subject to the pressure of fluid from said brake pipe, and means for maintaining said valve piston in its normal inoperative position until the brake pipe pressure has been increased above that normally carried.

15. In a fluid pressure brake, the combination with a brake pipe, of means for effecting a graduated release of the brakes, a valve normally rendering said means ineffective to graduate the release of the brakes and operative to render said means effective to graduate the release of the brakes, means for normally maintaining said valve in its normal position, and means subject to fluid under pressure from the brake pipe and operative upon an increase in the pressure of fluid in the brake pipe above that normally carried for shifting said valve from its normal position to the position in which the first mentioned means is rendered effective to graduate the release of the brakes.

16. In a fluid pressure brake, the combination with a brake pipe, of means for effecting a graduated release of the brakes, a valve normally rendering said means ineffective to graduate the release of the brakes and operative to render said means effective to graduate the release of the brakes, means for normally maintaining said valve in its normal position, a valve piston subject to fluid under pressure from the brake pipe and operative upon an increase in the pressure of fluid in the brake pipe above that normally carried for shifting said valve from its normal position to the position in which the first mentioned means is rendered effective to graduate the release of the brakes, means for returning said valve piston to its normal position upon a reduction in brake pipe pressure below that normally carried and for maintaining the valve piston in its normal position against normal brake pipe pressure.

17. In a fluid pressure brake, the combination with a brake pipe, of means for effecting a graduated release of the brakes, a valve normally rendering said means ineffective to graduate the release of the brakes and operative to a position to render said means effective to graduate the release of the brakes, a stem for said valve, a spring, and a piston subject to the opposing pressures of said spring and the pressure of fluid in the brake pipe for controlling the operation of said stem and thereby said valve.

18. In a fluid pressure brake, the combination with a brake pipe, of means for effecting a graduated release of the brakes, a valve normally rendering said means ineffective to graduate the release of the brakes and operative to a position to render said means effective to graduate the release of the brakes, a stem for said valve, a spring, and a piston for controlling the operation of said stem and thereby said valve, said piston being normally maintained out of operative engagement with said stem by the pressure of said spring against the opposing pressure of fluid normally carried in the brake pipe and operative against the opposing pressure of said spring upon an increase in brake pipe pressure above that normally carried for operatively engaging said stem.

19. In a fluid pressure brake, the combination with a brake pipe, of means for effecting a graduated release of the brakes, and means constantly subject to brake pipe pressure normally rendering the first mentioned means ineffective to control the release of the brakes and operative upon an increase in brake pipe pressure above that normally carried for rendering the first mentioned means effective to control the release of the brakes.

20. In a fluid pressure brake, the combination with a brake pipe, of means for effecting a graduated release of the brakes, and means constantly subject to brake pipe pressure normally rendering the first mentioned means ineffective to control the release of the brakes and operative upon an increase in brake pipe pressure above that normally carried for rendering the first mentioned means effective to control the release of the brakes and further operative upon a reduction in brake pipe pressure below that normally carried for again rendering the first mentioned means ineffective to control the release of the brakes.

21. In a fluid pressure brake, the combination with a brake pipe, a triple valve device, a brake cylinder, and a control valve device, of a valve for controlling communication through said triple valve device from the brake cylinder to the atmosphere to control the direct release of the brakes and for controlling communication through said triple valve device and control valve device from the brake cylinder to the atmosphere to control the graduated release of the brakes, and means subject to the pressure of fluid from said brake pipe and operative upon an increase in the pressure of fluid in the brake pipe for operating said valve to open one of said communications and to close the other of said communications.

22. In a fluid pressure brake, the combination with a fluid pressure supply source, of means for effecting a graduated release of the brakes, valve means normally rendering said means ineffective to graduate the release of the brakes and operative to render said means effective to graduate the release of the brakes, a spring, and a valve piston subject to the opposing pressures of said spring and fluid supplied from said fluid pressure supply source for controlling the operation of said valve means, the pressure of said spring normally maintaining said valve piston out of operative engagement with said valve means against the normal pressure of fluid from said source, said valve piston being operable into operative engagement with said valve means upon an increase in the pressure of fluid in said source above that normally carried.

23. In a fluid pressure brake, the combination with a fluid pressure supply source, of means for effecting a graduated release of the brakes, valve means normally rendering said means ineffective to graduate the release of the brakes and operative to render said means effective to graduate the release of the brakes, a spring, and a valve piston subject to the opposing pressures of said spring and fluid supplied from said fluid pressure supply source for controlling the operation of said valve means, the pressure of said spring normally maintaining said valve piston out of operative engagement with said valve means against the normal pressure of fluid from said source acting on said valve piston over a portion only of its area, said valve piston being operable into operative engagement with said valve means upon an increase in the pressure of fluid in said source above that normally carried.

24. In a fluid pressure brake, the combination with a fluid pressure supply source, of means for effecting a graduated release of the brakes, valve means normally rendering said means ineffective to graduate the release of the brakes and operative to render said means effective to graduate the release of the brakes, a spring, and a valve piston subject to the opposing pressures of said spring and fluid supplied from said fluid pressure supply source for controlling the operation of said valve means, the pressure of said spring normally maintaining said valve piston out of operative engagement with said valve means against the normal pressure of fluid from said source acting on said valve piston over a portion only of its area, said valve piston being operable into operative engagement with said valve means upon an increase in the pressure of fluid in said source above that normally carried, and being operable to its normal position by the pressure of said spring upon the reduction in the pressure of fluid acting on said valve piston over its whole area below that normally carried by said source.

In testimony whereof I have hereunto set my hand, this 2nd day of May, 1930.

CLYDE C. FARMER.